(12) United States Patent
Lefèvre et al.

(10) Patent No.: US 12,309,579 B2
(45) Date of Patent: May 20, 2025

(54) METHOD AND SYSTEM FOR ADAPTIVE TRUST RECOVERY IN MIXED ENVIRONMENT COMMUNICATIONS

(71) Applicants: AT&T Global Network Services Belgium Luxembourg SPRL, Vilvoorde (BE); AT&T Intellectual Property I, L.P., Atlanta, GA (US)

(72) Inventors: Catherine Lefèvre, Corroy-le-Chateau (BE); James H. Pratt, Round Rock, TX (US); Eric Zavesky, Austin, TX (US); Christophe Closset, Jehay (BE); Gervais-Martial Ngueko, Brussels (BE)

(73) Assignees: AT&T Intellectual Property I, L.P., Atlanta, GA (US); AT&T Global Network Services Belgium Luxembourg SPRL, Vilvoorde (BE)

( * ) Notice: Subject to any disclaimer, the term of this patent is extended or adjusted under 35 U.S.C. 154(b) by 414 days.

(21) Appl. No.: 17/700,604

(22) Filed: Mar. 22, 2022

(65) Prior Publication Data
US 2023/0308453 A1    Sep. 28, 2023

(51) Int. Cl.
*H04W 12/04*  (2021.01)
*G06F 16/735*  (2019.01)
(Continued)

(52) U.S. Cl.
CPC .......... *H04W 12/04* (2013.01); *G06F 16/735* (2019.01); *G06Q 10/10* (2013.01); *G16Y 30/10* (2020.01); *H04L 41/50* (2013.01); *H04L 63/105* (2013.01)

(58) Field of Classification Search
CPC ..... H04W 12/04; H04W 12/08; H04W 12/64; H04L 63/20; H04L 9/088; H04L 63/105;
(Continued)

(56) References Cited

U.S. PATENT DOCUMENTS

| 10,594,569 B2 | 3/2020 | Zavesky et al. |
| 2010/0332669 A1* | 12/2010 | Yang ...................... G06Q 10/10 709/229 |

(Continued)

FOREIGN PATENT DOCUMENTS

| CN | 112491615 A | * | 3/2021 | ............. H04L 41/50 |
| RU | 130429 U1 | * | 7/2013 | |
| TW | 1740409 B | * | 9/2021 | |

OTHER PUBLICATIONS

"Internet of Things", https://en.wikipedia.org/wiki/Internet_of_things, Jan. 31, 2022, 42 pgs.
(Continued)

*Primary Examiner* — Kyung H Shin
(74) *Attorney, Agent, or Firm* — Guntin & Gust, PLC; Robert Gingher

(57) ABSTRACT

Aspects of the subject disclosure may include, for example, detecting communications between a source device and a destination device, wherein the communications relate to a particular context and are facilitated over a first network associated with the destination device, determining a state or trust level for the particular context based on reference data, detecting a change in behavior of the source device, updating the state or trust level based on the detecting the change in behavior of the source device, resulting in an updated state or trust level, identifying a loss of trust condition based on the updated state or trust level, restricting communications between the source device and the destination device, and performing a trust rebuild process in an attempt to address the loss of trust condition and to enable the source device to resume communications with the destination device. Other embodiments are disclosed.

20 Claims, 9 Drawing Sheets

(51) Int. Cl.
    *G06Q 10/10*     (2023.01)
    *G16Y 30/10*     (2020.01)
    *H04L 9/40*     (2022.01)
    *H04L 41/50*     (2022.01)

(58) Field of Classification Search
    CPC ....... H04L 43/55; H04L 41/50; H04L 9/0869; H04L 9/3263; H04L 9/0825; H04L 9/3278; H04L 9/0866; H04L 9/3268; H04L 9/3236; H04L 9/3242; H04L 9/3247; H04L 63/0442; G06F 21/33; G06F 16/735; G06F 16/7867; G06F 16/78; G06F 16/7834; G06F 16/7844; G06F 16/732; G06F 16/738; G06Q 10/10; H04N 21/4668; H04N 21/858; H04N 21/43074; H04N 21/4431
    See application file for complete search history.

(56) References Cited

U.S. PATENT DOCUMENTS

| | | | |
|---|---|---|---|
| 2015/0044994 A1* | 2/2015 | Kumoluyi | H04W 12/04 455/410 |
| 2023/0009515 A1* | 1/2023 | Agarwal | G06F 16/735 |

OTHER PUBLICATIONS

Delbene, et al., "The Road to Zero Trust (Security)", DIB Zero Trust White Paper, Jul. 9, 2019, 10 pages.

Ekudden, Erik, "Five Network Trends", https://www.ericsson.com/en/reports-and-papers/ericsson-technology-review/articles/technology-trends-2021, Sep. 14, 2021, 5 pgs.

* cited by examiner

METHOD AND SYSTEM FOR ADAPTIVE TRUST RECOVERY IN MIXED ENVIRONMENT COMMUNICATIONS

FIELD OF THE DISCLOSURE

The subject disclosure relates to adaptive trust recovery in mixed environment communications.

BACKGROUND

Internet-of-Things (IoT) devices, such as environmental or biometric sensors, cameras, and smart assistants, are now commonly found in many homes and businesses. As technology continues to evolve, these devices are expected to play ever increasing roles in our daily lives. For instance, IoT devices have been used (and will likely continue to be used) to provide critical functions, such as controlling access to secure computer/network systems, providing health monitoring and triggering of medical-related actions (e.g., requests for medical assistance), and so on. Additionally, it has also become increasingly popular to employ uncrewed/unmanned aerial vehicles (UAVs) or drones for remote-based missions, such as site inspections, connection line repairs, government-related surveillance operations, and physical deliveries of goods.

BRIEF DESCRIPTION OF THE DRAWINGS

Reference will now be made to the accompanying drawings, which are not necessarily drawn to scale, and wherein.

DETAILED DESCRIPTION

Figure 1:
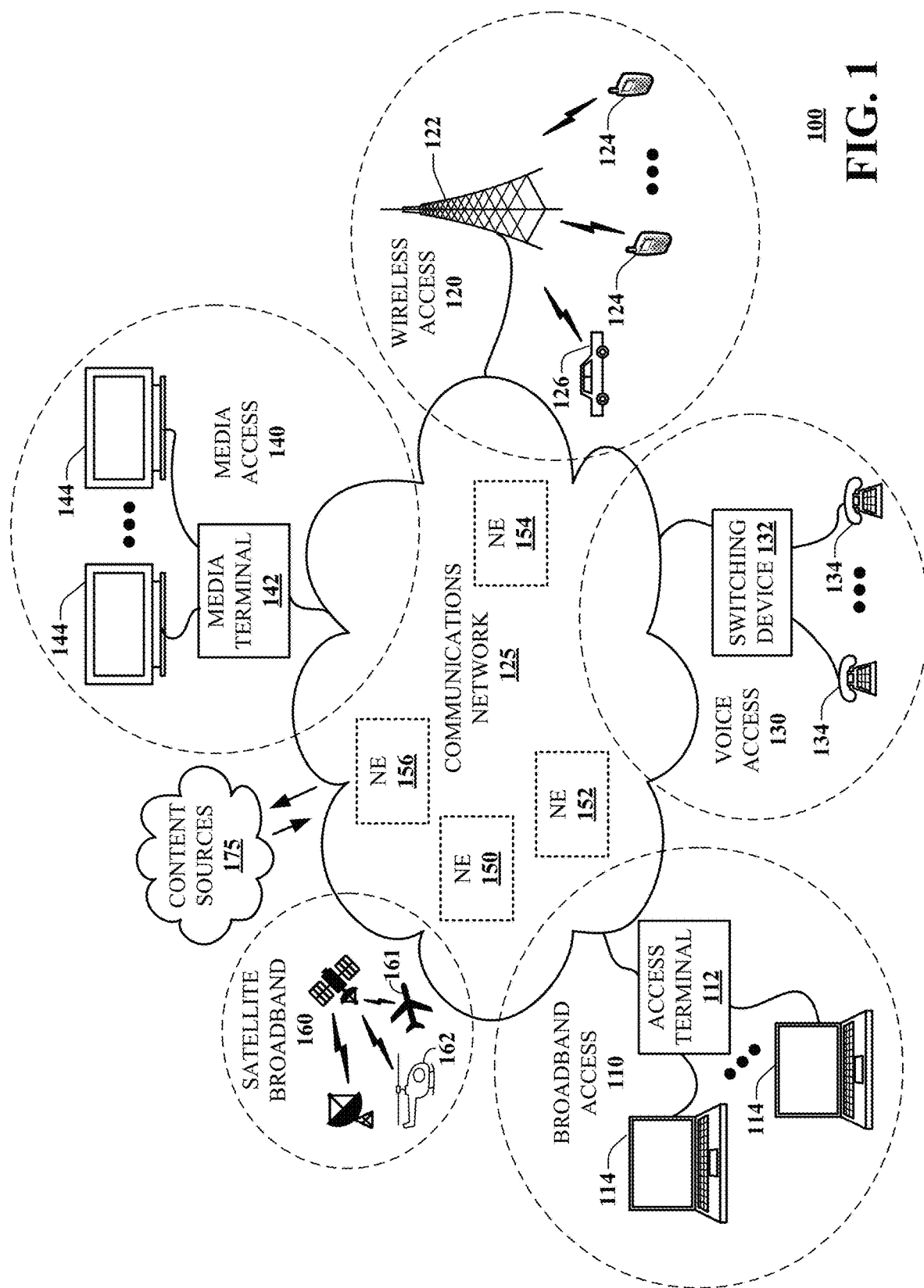
FIG. 1 is a block diagram illustrating an exemplary, non-limiting embodiment of a communications network in accordance with various aspects described herein.

Because IoT devices, drones, or the like may communicate with, or otherwise feed data to, central (e.g., trusted) systems, they are heavily targeted by attackers seeking to disable/clog communication routes or generally compromise the systems for their own malicious gain. Where these devices serve crucial roles in security-sensitive areas, such as healthcare, banking, or government operations, protecting the overall systems and networks from attacks is of utmost importance. In the development of 5G and 6G protocols, the term "zero trust" has been utilized to identify and propose rulesets for developing a higher level of safety for modern IoT devices and networks. Currently, it is believed that there are no means for meshing/switching network topologies and for building a sense of trust for combined or alternate network routes. For instance, in a case where a given device suddenly switches from using a primary route of communication to a new or alternate one, it can be difficult to determine if this is "normal" behavior or if the device has been compromised. Or, in a case where an alternate network topology needs to be used as a backup or support for a primary communication route, it can be difficult to determine whether the alternate route is generally "safe" to use. For example, it can be difficult to predict whether an alternate, wide area network (WAN)-based route is more or less trustworthy to use than a primary, local area network (LAN)-based route, and vice versa.

The subject disclosure describes, among other things, illustrative embodiments of a trust orchestrator platform that is capable of providing (e.g., learned) adaptive "trust" recovery in (e.g., mixed environment) communications. As used herein, "trust" may relate to the behavior-characteristics, parameters, and/or operations (e.g., data traffic patterns, network flow or selection of communication routes, etc.)—of a device, application, service, or network relative to a norm, such as its historical behavior or other known reference point(s). In exemplary embodiments, trust, or a trust level or score, may be used to characterize such behavior, and may be compared with one or more thresholds to identify deviations from (e.g., accepted) norm(s) and generally determine if trust has been "lost," which can guide the decisions and/or actions of the trust orchestrator platform, as described herein. In various embodiments, trust may additionally, or alternatively, relate to identified adjustments to a system that can be taken in response to monitored conditions. In these embodiments, the trust orchestrator platform may provide determined trust levels to subject entities/devices for permission to implement the adjustments, as described herein.

In various embodiments, the trust orchestrator platform may be configured to provide for automatic creation/defining and association of trust through data-based model learning of characteristics, parameters, and/or operations associated with devices, applications, services, and/or networks to improve fault tolerance and decrease the overall risks of security breaches or fraud. In some embodiments, the trust orchestrator platform may be configured to provide some or all of this functionality in a semi-automatic manner, where manual inputs, such as those relating to system updates, communication path maintenance/repairs, data loading, and so on, may influence decisions and/or actions of the trust orchestrator platform.

As described herein, the trust orchestrator platform may be configured to perform various functions as part of providing overall trust management and recovery. In exemplary embodiments, the trust orchestrator platform may be configured to learn trustworthy behaviors/patterns in a given "context" of entities (e.g., devices, applications, services, networks, etc.) managed by a local, remote, or distributed target device/system. Example "contexts" may include government drone operations where a drone communicates with a central drone controller over a certain communication path, health monitoring in which a sensor feeds measurements to a health-related application executing on a mobile device, financial transactions where a financial application communicates transaction data to a secure server/system, systems for confidential computing where sensitive data or algorithms execute in ephemeral environments (including, for example, situations involving user-to-user "messaging," such as e-mail, text-based messaging, and/or sharing of pictures/videos), and so on.

In various embodiments, the trust orchestrator platform may additionally, or alternatively, be configured to orchestrate updates to a state (e.g., in the context) according to changes in device-related characteristics, parameters, and/or operations (such as changes to network routes, data traffic patterns, etc.), and to perform adjustments to trust levels based on these changes as part of maintaining (or attempting to maintain) a continuum of trust between connected entities. In some embodiments, the trust orchestrator platform may additionally, or alternatively, be configured to adjust trust levels responsive to data/queries submitted to the trust orchestrator platform from one or more of the entities. In certain embodiments, the trust orchestrator platform may additionally, or alternatively, be configured to communicate determined trust levels to a target device/system (or other devices/systems) that might be impacted through (e.g., business) rules.

In one or more embodiments, the trust orchestrator platform may, for a given device, application, service, or network, identify reference trust level(s) for (e.g., established or determined) norm(s) or initial state(s), adjust trust level(s) based on monitoring of the behavior of the device, application, service, network (e.g., for anomalous behavior), and perform one or more action(s) for controlling communications between the device, application, service, or network and a target device/system based on deviation(s) of adjusted trust level(s) from the reference trust level(s). Here, a trust level that satisfies (e.g., falls below) a threshold trust value may equate to a loss of trust and, for example, result in the trust orchestrator platform (e.g., completely) restricting the device, application, service, or network from communicating with the target device/system.

In exemplary embodiments, the trust orchestrator platform may be configured to provide dynamic trust validation based on the particular context, where communication/connection parameters and/or application data flow, for instance, may be (e.g., continuously) monitored and validated according to established norms associated with the context in order to preemptively identify anomalies and isolate issues. In various embodiments, a norm may be determined by data-driven model(s) generated based on user input or automatically according to prestored specifications, historical data, and/or learnings over time, as described herein.

The trust orchestrator platform may control communications between entities in a variety of ways. For instance, the trust orchestrator platform may control communications by permitting a device, application, service, network, or user to access certain system(s)/resource(s) or restricting the device, application, service, network, or user from accessing such system(s)/resource(s). As another example, the trust orchestrator platform may control communications by permitting certain communication path(s) to be utilized or restricting these communication path(s) from being utilized. As a further example, the trust orchestrator platform may control communications by requiring authentication for certain connection(s)/communication(s) or forgoing authentication for such connection(s)/communication(s).

In various embodiments, in a case where there is a loss of trust (whether proposed by a target device/system or determined via detection of one or more anomalies), the trust orchestrator platform may employ one or more (e.g., methodical) data-based algorithms to (e.g., attempt to) rebuild the trust. This rebuild process may be implemented across one or more failure conditions and/or backup utilities. For instance, where a failure involves a system/network breach, failed authentication, a connection drop, etc., the process may involve determining when/where the failure originated, rebuilding the last known state, identifying and evaluating states for (or across) different channels (or communication paths), and/or using threshold trust level(s) for comparisons.

In exemplary embodiments, the trust orchestrator platform may be implemented in a network and/or a device (e.g., a central, target, or destination device, as described in various examples herein) as one or more functions that monitor for anomalous behaviors. For instance, in the context of drone operations, where a source device, such as a drone, delivers flight updates to a downstream/destination drone controller, the trust orchestrator platform may be implemented in the destination drone controller and/or in a network associated with the destination drone controller, and may monitor the drone's delivery of flight updates to detect for anomalies, such as unusual network flows or delivery patterns.

In one or more embodiments, the trust orchestrator platform may have "visibility" across a wide range of (e.g., customer) devices, applications, services, networks, systems, contexts, etc., and may leverage that visibility to learn (e.g., automatically or upon request) the aforementioned, typical/accepted behaviors, patterns, or norms. In some embodiments, the trust orchestrator platform may be configured to provide (e.g., automatically or upon request) notifications regarding detected anomalies to interested parties, such as administrators, consumers, and so on.

In cases where the trust orchestrator platform is distributed among multiple devices/systems (e.g., across local resources, a cloud infrastructure, and/or a multi-access edge computing (MEC) system), the maintaining of trust—e.g., the updating of trust levels based on changes in device-related characteristics, parameters, and/or operations and/or based on identified adjustments to the system that can be made to address changing conditions—and/or the reconstruction of trust may or may not be feasible. Thus, in certain embodiments, the trust orchestrator platform may associate cost(s) with behaviors/operations of a device, application, service, or network and/or with identified adjustments to the system, and may determine whether to effect corresponding action(s) depending on the cost(s). Because various device behaviors/operations and/or system adjustments may result in differing deviations from a historical state or norm, the trust orchestrator platform may associate different costs with different device behaviors/operations, system adjustments, and/or corresponding trust level updates. For instance, the trust orchestrator platform may associate a first cost for a first trust level (or for a first trust level update of a certain magnitude) if a device switches to a first alternate network path for communications, a second (higher or lower) cost for a second trust level (or for a second trust level update of a different magnitude) if the device switches to a second alternate network path for communications, and so on.

In various embodiments, a device, application, service, network, or related context, may be associated with a priority (e.g., an inherited priority level), which the trust orchestrator platform may utilize to determine impacts to trust levels and/or to determine cost(s) associated with trust level updates, as described in more detail elsewhere herein. For instance, in drone-related operations, a certain critical mission, such as repairing Internet connection lines, may be associated with a higher priority than a mere reconnaissance mission. Or, in a health measurement context, a heart-related sensor that can trigger notifications to first responders in an emergency situation may be associated with a higher priority than a sensor that counts the number of steps taken by a user.

Exemplary embodiments of the trust orchestrator platform described herein enable automated trust management for devices, applications, services, or networks with minimal to no user interaction. In embodiments where the trust orchestrator platform is provided with "visibility" across a wide range of devices, applications, services, networks, systems, contexts, etc., knowledge attained from such diverse data sets enhances the platform's ability to implement trust-based controls in manners that are otherwise too complex to achieve using mere manual rule creation. For example, if a secondary network is suddenly requested by an application, it may be a normal operation to accommodate a higher bandwidth or compute requirement. However, if that network switch is accompanied by a loss of user authentication, it may mean the system has been compromised or impersonated by a nefarious entity.

Monitoring and learning behaviors or patterns of a device, application, service, or network in a given context associated with a certain priority, adjusting trust levels based on monitored characteristics, parameters, and/or operations, and/or propagating (e.g., application-specific) rules (that differentiate trust by signature of the network, data source, etc. and that dictate how trustful a network, device, or capability is) to the trust orchestrator platform enables the trust orchestrator platform to provide improved, adaptive trust reconstruction. For instance, the trust orchestrator platform may, based on monitored behaviors/patterns, adjusted trust levels, and/or propagated rules, detect the use of alternate network topologies (e.g., a new network, such as where a device switches from one network connection to another based on available network connectivity), characterize risk(s) associated with the alternate connection(s), determine the alternate connection(s) as being acceptable, and facilitate use (or integration) of such alternate network topologies in that context, which improves overall system performance and flexibility while also maintaining system/network safety and reliability.

In embodiments where functions of the trust orchestrator platform are manually alterable, users may define and/or modify rules or criteria for establishing trust, which provides flexibility to the overall implementation of trust-based controls as (e.g., business) needs change.

In some embodiments, the trust orchestrator platform may (e.g., rather than performing generalized repair/dispatch) prioritize rebuilding (or reconstruction) of trust based on cost-related factors, such as, for example, service level agreements (SLAs) relating to multi-facility arrangements, very important person (VIP) clients, etc. Here, the trust orchestrator platform may identify different tiers based on SLAs, and prioritize trust reconstruction, such as by speeding up the rebuild process, in situations involving higher-tiered SLAs.

In certain embodiments, the trust orchestrator platform may additionally, or alternatively, prioritize rebuilding of trust based on determined trust impact—e.g., how quickly or how much a trust level deviates from a reference trust level. For instance, the trust orchestrator platform may speed up the rebuild process in situations where trust impacts are determined to be larger.

One or more aspects of the subject disclosure include a device, comprising a processing system including a processor, and a memory that stores executable instructions that, when executed by the processing system, facilitate performance of operations. The operations can include detecting communications between a source device and a destination device, wherein the communications relate to a particular context and are facilitated over a first network associated with the destination device. Further, the operations can include determining a state or trust level for the particular context based on reference data. Further, the operations can include, after the determining the state or trust level, detecting a change in behavior of the source device. Further, the operations can include updating the state or trust level based on the detecting the change in behavior of the source device, resulting in an updated state or trust level. Further, the operations can include identifying a loss of trust condition based on the updated state or trust level. Further, the operations can include, responsive to the identifying the loss of trust condition, restricting communications between the source device and the destination device. Further, the operations can include performing a trust rebuild process in an attempt to address the loss of trust condition and to enable the source device to resume communications with the destination device.

One or more aspects of the subject disclosure include a non-transitory machine-readable medium, comprising executable instructions that, when executed by a processing system of a destination device including a processor, facilitate performance of operations. The operations can include establishing communications with a plurality of source devices, wherein the communications relate to a context, wherein the communications are monitored by a trust orchestrator, and wherein the trust orchestrator is configured to provide adaptive trust management by determining a trust level that corresponds to a reference state for the context, monitoring operations associated with one or more source devices of the plurality of source devices, identifying actions to be performed based on monitored operations, and computing adjusted trust levels for the actions. Further, the operations can include obtaining, from the trust orchestrator, information regarding a particular trust level that corresponds to a particular action. Further, the operations can include determining whether the particular trust level is acceptable based on a security parameter. Further, the operations can include, responsive to a determination that the particular trust level is not acceptable based on the security parameter, providing, to the trust orchestrator, a notification of the determination to prevent the trust orchestrator from facilitating the particular action.

One or more aspects of the subject disclosure include a method. The method can comprise initializing, by a processing system including a processor, a session based on detecting communications between a source device and a destination device, wherein the communications relate to a context. Further, the method can include determining, by the processing system, a reference state for the source device and the destination device in accordance with an oracle, wherein the oracle includes reference data relating to an accepted norm for the context. Further, the method can include monitoring, by the processing system, operations associated with one or more of the source device and the destination device. Further, the method can include, responsive to detecting, according to the monitoring, a change in behavior of the source device, determining, by the processing system, a state change and a corresponding trust level. Further, the method can include identifying, by the processing system, a loss of trust condition based on the state change or the corresponding trust level. Further, the method can include effecting, by the processing system, trust reconstruction in an attempt to address the loss of trust condition and to enable the source device to continue communicating with the destination device.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, learned, adaptive trust management/recovery in mixed environment communications, such as that described herein with respect to one or more of FIGS. 2A-2D. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132, media access 140 to a plurality of audio/video display devices 144 via media terminal 142, and/or satellite broadband access to aerial transportation vehicles 161, 162. In addition, communications network 125 is coupled to one or more content sources 175 of audio, video, graphics, text and/or other media. While broadband access 110, wireless access 120, voice access 130, media access 140, and satellite broadband access 160 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140, satellite broadband access 160, and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, 6G or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, 6G, or higher generation modem, an optical modem and/or another access devices.

In various embodiments, the base station or access point 122 can include a 4G, 5G, 6G, or higher generation base station, an access point that operates via an 802.11 standard such as 802.11n, 802.11ac or other wireless access terminal.

The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
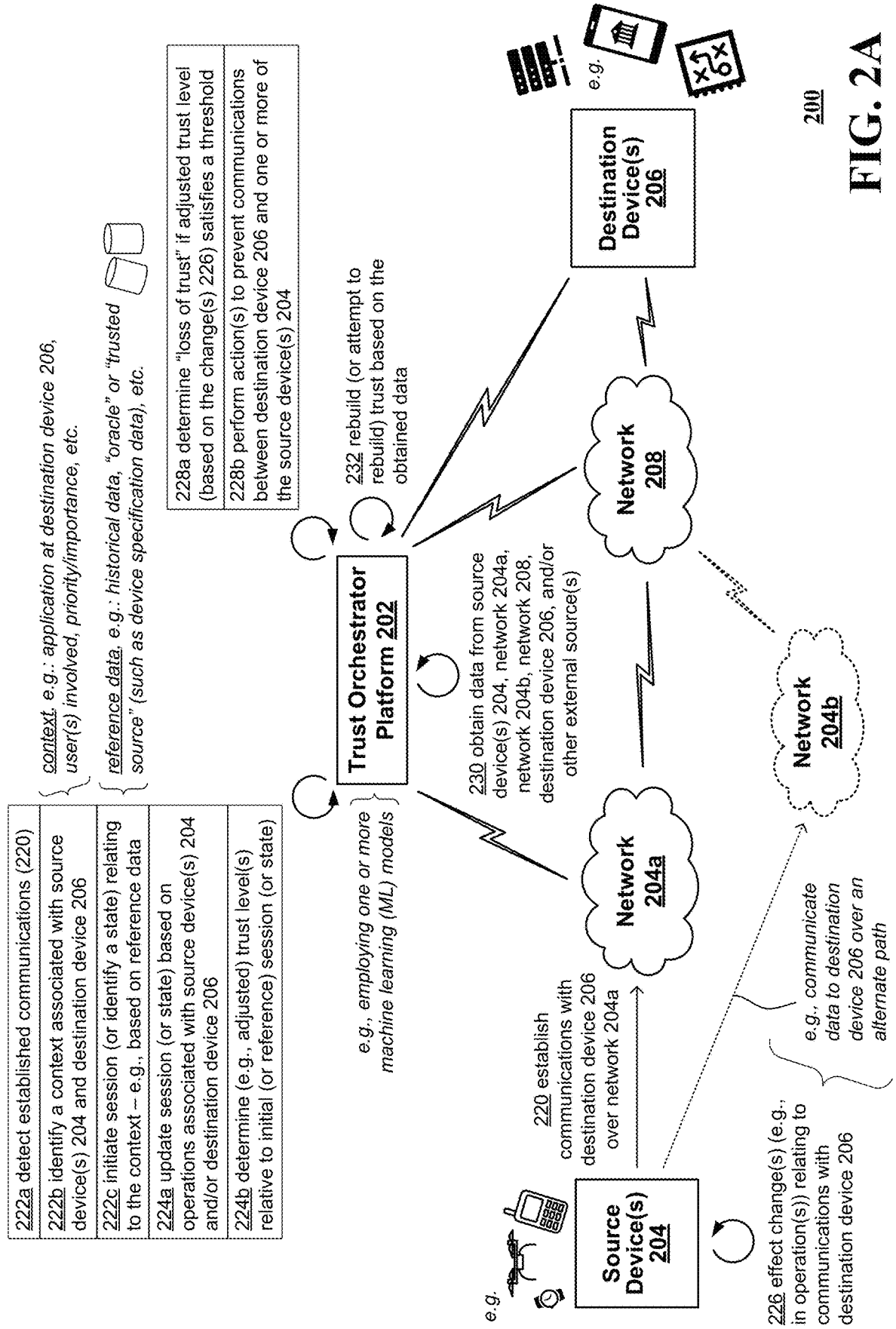
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a system 200 configured to function in, or in conjunction with, various communication systems and networks, including, for example, the communications system 100 of FIG. 1, in accordance with various aspects described herein. As shown in FIG. 2A, the system 200 may include a trust orchestrator platform 202, source device(s) 204, a destination device 206, a network 204a, a network 204b, and a network 208.

In various embodiments, a source device 204 may include an IoT device, such as a communication device (e.g., a router, a modem, a mobile phone, or a wearable device, such as a smart wristwatch, a pair of smart eyeglasses, media-related gear (e.g., augmented reality (AR), virtual reality (VR), or mixed reality (MR) glasses and/or headset/headphones)), a biometric sensor (e.g., for monitoring heart rate, blood pressure, pulse, breathing, etc.), an electrical switch controller, a security camera, an automated assistant, a smart TV, an environmental sensor/controller (e.g., for lighting, temperature, audio, etc.), a kitchen/bath appliance controller (e.g., for a stove, a dehumidifier, etc.), a drapery (e.g., curtain, shade, blinds, or the like) controller, a door/lock controller (e.g., for a room door, a garage door, etc.), a similar type of device, a different type of device, or a combination of some or all of these devices.

In some embodiments, a source device 204 may include a personal or commercial aerial vehicle or device equipped with one or more types of devices or components for performing various actions. For example, a UAV 204 may include one or more radio equipment configured to function as a cellular relay, one or more sensors (e.g., image sensor(s), infrared sensor(s), near infrared camera(s), radar system(s), light detection and ranging (LIDAR) system(s), biological sensor(s), temperature sensor(s), chemical sensor(s), humidity sensor(s), and/or the like) for capturing information/data in an environment of the UAV 204, one or more mechanical limbs for physically manipulating external objects, and/or the like. In various embodiments, a source device 204 may include one or more (e.g., an array of) low-capability devices, such as a sensory array network used in a smart city application to compute pollution, audio, or traffic conditions in a smaller environment.

Each of the networks 204a, 204b, and 208 may include one or more wired and/or wireless networks. For example, each of the networks 204a, 204b, and 208 may include a cellular network (e.g., a long-term evolution (LTE) network, a code division multiple access (CDMA) network, a 3G network, a 4G network, a 5G network, a 6G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In various embodiments, as described in more detail below, the networks 204a and 204b may be different types of networks that employ different access technologies.

Although not shown, in one or more embodiments, each of some or all of the networks 204a, 204b, and 208 may include one or more network nodes or access points—e.g., base stations or the like—that each employs an access technology for facilitating communications between one or more devices/systems (e.g., trust orchestrator platform 202, source device(s) 204, and/or destination device 206) and one or more core networks. The system 200 may also include any number of edge systems/devices associated with such access points. In certain embodiments, an edge system may correspond to, or be associated with, more than one access point. The particular functions performed by an edge system can vary based on various criteria or requirements of the network. In various embodiments, access points and corresponding edge systems may be associated with (e.g., respective) cells, such as heterogeneous cells (e.g., that provide network access using different types of radio access technologies). In some embodiments, the cells can be terrestrial cells (e.g., one or more macrocells, small cells or microcells, Wi-Fi-based cell(s), or the like) or non-terrestrial cells (e.g., a flying cell, or drone cell, served by UAVs). The system 200 can include various quantities of cells (e.g., primary cells and/or secondary cells), various quantities of access points in a cell, and/or various types of access points and/or cells. In embodiments where the source device(s) 204 include UAVs, the UAVs may be located within cell coverage areas of the system 200 (provided by cells associated with the various access points), and may travel amongst various ones of the cells.

In exemplary embodiments, the trust orchestrator platform 202 may be implemented in one or more devices capable of providing dynamic trust validation based on context, where communication/connection parameters and/or application data flow may be (e.g., continuously) monitored and validated according to established norms in order to preemptively identify anomalies and isolate issues.

Although FIG. 2A shows the trust orchestrator platform 202 as being independently implemented, functionality of the trust orchestrator platform 202 may be implemented in one or more of the other devices/networks in system 200. In exemplary embodiments, functionality of the trust orchestrator platform 202 may be implemented in one or more destination devices 206 and/or the network 208 (e.g., in a distributed manner across node(s) of the network 208).

As shown in FIG. 2A, the trust orchestrator platform 202 may provide for adaptive trust management and recovery in mixed environment communications, where different types of communications networks are involved. In various embodiments, some or all of the networks 204a, 204b, and 208 may be different from one another. For example, in some implementations, the network 204a may employ a certain type of network technology (e.g., 5G), the network 204b may employ another type of network technology (e.g., satellite-based technology), and/or the network 208 may employ yet another type of network technology (e.g., a mesh network).

It is to be appreciated and understood that the trust orchestrator platform 202 may provide for adaptive trust management and recovery in a variety of contexts. As briefly described above, some example "contexts" may include government drone operations where a drone communicates with a central drone controller over a certain communication path, health monitoring in which a sensor feeds measurements to a health-related application executing on a mobile device, and financial transactions where a financial application communicates transaction data to a secure server/system.

Figure 2B:
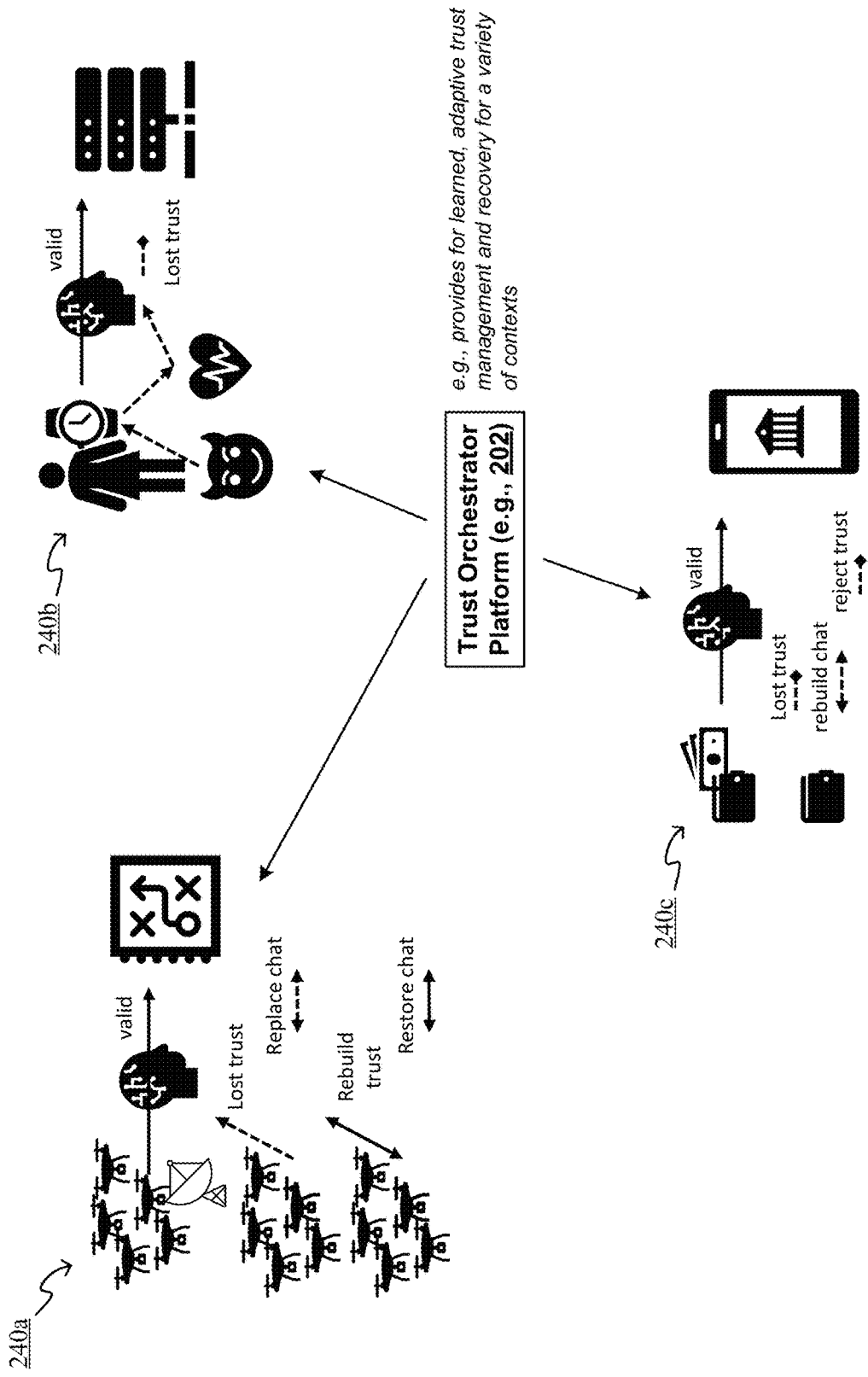
FIG. 2B depicts example contexts for which the system of FIG. 2A may operate in accordance with various aspects described herein.

As one example, in the case of drone-related operations, such as that shown by reference number 240a of FIG. 2B, a set of drones (e.g., source device(s) 204 of FIG. 2A) may be deployed in a swarm and controlled by a swarm controller (e.g., destination device 206 of FIG. 2A) in concert to provide one or more functions, such as repairing of communication lines, providing of entertainment (e.g., a light show), or the like. Here, the trust orchestrator platform 202 of FIG. 2A may determine the context, identify a priority associated with the context (where, e.g., a certain critical mission, such as repairing connection lines, may be treated as having higher priority than a reconnaissance mission), and provide adaptive trust management and recovery for the context, as described herein. For instance, in a case where one of the drones in the swarm begins to act in a manner that deviates from a determined norm, the trust orchestrator platform 202 may, based upon detecting the deviation (and regardless of whether the swarm controller or the drone itself detects such a deviation), identify a failure in trust conveyance and perform one or more actions to address the failure. These action(s) may include, for example, restricting an ability of the affected drone to communicate with the swarm controller, restricting an ability of the affected drone to communicate with the other drones in the swarm or vice versa (e.g., by "partitioning" the drone from the swarm), and/or possibly even restricting all of the drones from communicating with the swarm controller. In various embodiments, the trust orchestrator platform 202 may (e.g., as the swarm rebalances) effect a trust rebuild process, which may involve lifting of the abovementioned restriction(s) in an iterative manner (e.g., as the affected drone's behavior is determined to deviate less and less from the norm). This improves over typical swarm reconstruction since the trust orchestrator platform 202 may employ secondary network-based evaluations in the rebuild phase.

As another example, in the case of health measurements, such as that shown by reference number 240b of FIG. 2B, an individual may utilize one or more sensors (e.g., source device(s) 204, such as biometric device(s), smartphone-based sensor(s), clothing-based sensor(s), etc.) to perform the measurements, which may be fed to a central system, such as a mobile device that is executing a health-related application. Here, the trust orchestrator platform 202 may determine the context and provide adaptive trust management and recovery for the context, as described herein. For instance, in a case where one of the sensors is hacked in public and can no longer provide updates to the health-related application, the trust orchestrator platform 202 may detect the issue (e.g., by identifying a connection loss associated with the affected sensor, a lack of updates from the affected sensor over a network route, decreased throughput, a lack of response from the affected sensor to the health-related application, transmission of determined improbable (or bad) data, such as data indicative of a heart attack, and so on), and may perform one or more corresponding actions. The action(s) may include, for example, notifying the health-related application (and/or mobile device) of the anomaly to trigger any remediation steps (such as restarting, or shutting down, of the application and/or the affected sensor), performing diagnostics on one or more portions of associated networks to remove/quarantine the health measurement infrastructure, actively monitoring network flow (e.g., switch/router activity, network logs, connection data, etc.) for behavior that transitions back towards an accepted norm, and/or the like. In various embodiments, the trust orchestrator platform 202 may, as described in more detail below, perform trust reconstruction (e.g., in an iterative manner) to enable the overall system to recover and operate once again.

As a further example, in the case of financial transactions, such as that shown by reference number 240c of FIG. 2B, a coffee shop's point-of-sale (POS) system may process customer payments for purchases. Here, the trust orchestrator platform 202 may determine the context and provide adaptive trust management and recovery for the context, as described herein. For instance, in a case where the POS system is infected with malware for stealing financial data, the trust orchestrator platform 202 may detect the issue (e.g., by identifying changes to communication routes, etc.), and may perform one or more corresponding actions. The action(s) may include, for example, disconnecting the POS system from the overall network (or otherwise quarantining the network from the POS system) for a period of time, re-initiating communications relating to the POS system, and/or the like. In various embodiments, the trust orchestrator platform 202 may perform trust reconstruction (e.g., in an iterative manner) to enable the POS system to recover and operate once again. Trust rebuild may involve, for example, monitoring for continued anomalous behavior (such as failed authentication, change to or loss of connectivity, or inability of the POS system to "replay" its history or logs stored prior to the malware infection), warning of other devices on the network to restrict communications with the POS system, and so on. In certain embodiments, the trust orchestrator platform 202 may continue implementing the trust rebuild process until trust is restored for the POS system to a threshold level.

Yet another example context may include a trusted device in communication with various other sources or devices in an entertainment context, such as a concert, where trust may be lost due to network saturation or crowding and/or due to the trusted device having connectivity with multiple endpoint devices in the same locale, but in varying states of data communications/transfer. Here, the trust orchestrator platform 202 may perform adaptive trust management and recovery via (e.g., continuous) validation of traffic and network state(s) to rebuild the trust. In certain embodiments, a rebuild process may involve use of blockchain processing or other forms of data recording for comparison purposes.

In various implementations, the trusted orchestrator platform 202 may utilize different trust level thresholds for different contexts or applications. For instance, different trust level thresholds may be used for civil operations, situations requiring real-time communications, emergencies involving first responders, and so on. In some embodiments, the trust orchestrator platform 202 may correlate implicit trust level(s) based on connectivity type (e.g., subscriber identity module (SIM)-based connections, satellite-based connections, etc.) in a current context, and may iterate through different network paths with corresponding trust levels to identify a "best" network path.

Referring to FIG. 2A, as shown by reference number 220, one or more of the source device(s) 204 may establish communications with the destination device 206 over the network 204a. For example, the destination device 206 and the one or more source devices 204 may establish a communication session via respective networks 204a and 208. The networks 204a and 208 may employ the same network technology or different network technologies. In a case where different network technologies are employed, the networks 204a and 208 may be configured to communicate with one another, either directly or via an intermediary network/system.

As shown by reference numbers 222a and 222b, the trust orchestrator platform 202 may detect the established communications, and identify a relevant context of the communications. A context may relate to an application/service implemented in the destination device 206 (e.g., a drone-related application, a health monitoring application, a banking application, etc.), users that may be involved, an (e.g., "inherited") priority/importance (e.g., where a higher priority may be associated with devices used in emergencies or government operations versus devices or situations used for entertainment purposes), and/or the like.

The trust orchestrator platform 202 may identify the context based on various available information. As one example, the trust orchestrator platform 202 may have access to prestored information regarding characteristics, parameters, and/or operations associated with the destination device 206, and may, based on determining that the destination device 206 is involved in the established communications (220), identify the relevant context based on the prestored information. As another example, the trust orchestrator platform 202 may additionally, or alternatively, identify the context based on identifying data in communications of the one or more source devices 204 and/or the destination device 206 that identifies the one or more source devices 204 and/or the destination device 206, or that is otherwise indicative of the context. Such data may include, for example, ID numbers in particular formats, manufacturer/provider information, entity information, special headers in data that suggest the types of operations relating to the source device(s) 204 and/or the destination device 206, and so on.

As shown by reference number 222c, the trust orchestrator platform 202 may initiate a session (or identify a state) relating to the context for data-driven modeling purposes. In various embodiments, data-driven modeling may be bootstrapped or loaded based on the context and performed for determination/management of trust levels (e.g., described in more detail below). In exemplary embodiments, the trust orchestrator platform 202 may identify a (e.g., default) state according to reference data associated with the one or more source devices 204 and/or the destination device 206. Reference data, for a given device, may identify, for example, the network(s) that the device is configured to use, network route(s) that the device employs (e.g., under various circumstances), characteristics/parameters of the device's communications (e.g., speed, periodicity, throughput, data types, etc.), capabilities of the device, priority/context associated with the device, safety specifications for the device, other device-related information described elsewhere herein, and so on. The reference data may be stored in, and accessible from, one or more databases, and may include historical information detected or monitored by the trust orchestrator platform 202 and/or another system. Additionally, or alternatively, the reference data may be an "oracle" or a "true source," such as, for instance, device vendor/provider specification or profile data for the one or more source devices 204 and/or the destination device 206 that has been verified/certified by the trust orchestration platform 202 and/or another system. In one or more embodiments, verification/certification of a known oracle may be based on longevity or fingerprint(s) with long-term persistence (e.g., existence/applicability of the reference data for an extended duration, such as longer than a threshold period of time) and/or based on vendor initialization (e.g., acknowledgement that what a vendor/provider has provided is accurate).

As shown by reference number 224a, the trust orchestrator platform 202 may update the session (or state) based on characteristics, parameters, and/or operations associated with the one or more source devices 204 and/or the destination device 206. In various embodiments, the network flow of a given device and/or the functions and data flow of a given application may (e.g., continuously) inform the state of the context. In exemplary embodiments, the trust orchestrator platform 202 may monitor, and catalog, the state and/or the characteristics, parameters, and/or operations (e.g., network flow, functional operations, data flow, etc.) as part of building historical reference dataset(s) (e.g., in the abovementioned database(s)) for the one or more source devices 204, the destination device 206, and/or the relevant context, and can utilize the dataset(s) for pattern/behavior comparisons.

In some embodiments, the trust orchestrator platform 202 may employ one or more machine learning (ML) models (e.g., via retraining of tuples) to define a present state that quantifies, or otherwise characterizes, the behavior/operations of the destination device 206 and/or the one or more source devices 204, such as (e.g., default) network connection(s)/route(s) used, (e.g., default) data traffic throughput, etc. In certain embodiments, the trust orchestrator platform 202 may additionally, or alternatively, update the aforementioned oracle and/or build a (e.g., long-term) oracle trust model for the context that quantifies, or otherwise characterizes, changes to the behavior/operations of the destination device 206 and/or the one or more source devices 204, such as changes to network connection(s)/route(s) used, duration of each change, etc. In either case, the trust orchestrator platform 202 may utilize the model(s) for later transaction replay(s)/resolution, which can be useful during the trust rebuild process (described in more detail below).

In certain embodiments, the trust orchestrator platform 202 may be configured to monitor and/or catalog characteristics, parameters, and/or operations in various phases of communications from source to destination, such as, for example: the collection of data by the one or more source devices 204 (e.g., phase 1); the transmission of the data over the network 204a or 204b (e.g., phase 2); the aggregation/determination of communication context by the trust orchestrator platform 202 (e.g., phase 3); the distribution of the data over the network 208 (e.g., phase 4); and receipt/consumption of the data by the destination device 206 (e.g., phase 5).

In this way, the trust orchestrator platform 202 may (e.g., continuously) monitor, and store, data regarding some or all aspects of a given context across the source device(s) 204, the various networks 204a, 204b, and 208, and the destination device 206, which may facilitate detection of anomalies and determination/adjustment of trust level(s).

As shown by reference number 224b, the trust orchestrator platform 202 may determine (e.g., adjusted) trust level(s) relative to an initial (or reference) session (or state). In one or more embodiments, the trust orchestrator platform 202 may employ ML model(s)/algorithm(s) to monitor for and/or detect (e.g., at an aggregate level) changes to context-related parameters so as to (e.g., continuously) validate whether the state/conditions are changing from a determined norm. In various embodiments, the trust orchestrator platform 202 may determine adjustment(s) to an initial trust level (e.g., associated with a steady state) by scoring detected anomalies/impacts relative to the state and/or by scoring received/requested state updates provided by the destination device 206.

For instance, as shown by reference number 226, one or more of the source device(s) 204 may effect change(s) (e.g., in operation(s)) relating to communications with the destination device 206. As an example, the one or more source devices 204 may (e.g., suddenly) communicate data to the destination device 206 over an alternate path—here, via network 204b—as opposed to an original or prior path, network 204a. As other examples, the one or more source devices 204 may alter its throughput (such as by transmitting data at a rate that is different than (e.g., faster or slower than) a previously-detected rate), change its packet sizes relative to previously-used packet sizes, utilize/access ports that are different from those previously-accessed, exhibit faster or slower response times than previously-detected response times, and so on. Based on detecting one or more of such anomalies, the trust orchestrator platform 202 may determine adjusted/new trust level(s) for the given context. As a simple example, assume that an initial (or oracle) state is associated with a trust level of '10' (on scale of scores ranging from '0' to '10'). Here, if a source device 204 is detected to have deviated from a determined norm in a particular way (e.g., has altered its network path to the destination device 206), the trust orchestrator platform 202 may adjust—e.g., decrease—the trust level by a certain (e.g., predefined) amount, such as, e.g., '1', '2', etc. Continuing the example, if the source device 204 is detected to have deviated from the determined norm in a different way (e.g., is not responding to query messages sent by the destination device 206), the trust orchestrator platform 202 may adjust—e.g., decrease—the trust level by the same or a different (e.g., predefined) amount, such as, e.g., '2', '3', etc.

In exemplary embodiments, the trust orchestrator platform 202 may associate cost(s) with behaviors or operations of a device, application, service, or network, and may determine whether to effect corresponding action(s) for purposes of trust management/reconstruction depending on those cost(s). In various embodiments, the trust orchestrator platform 202 may determine, or otherwise compute, a cost for each state/trust update or assertion. The trust orchestrator platform 202 may determine or compute a cost based on any suitable data, such as, for example, prestored data, user input, and/or knowledge attained by the trust orchestrator platform 202 over time. In some embodiments, the destination device 206 and/or one or more source devices 204 may provide data (e.g., information regarding resources needed to perform certain operations or the like) that serve as estimates for the trust orchestrator platform 202 to use in calculating costs for state updates.

In one or more embodiments, in a case where the trust orchestrator platform 202 determines that a cost for a particular state/trust update satisfies (e.g., exceeds) a threshold, the trust orchestrator platform 202 may or may not perform the state/trust update. For instance, the trust orchestrator platform 202 may avoid taking corrective actions if they are associated with excessive cost(s). Or, in a case where the trust orchestrator platform 202 is configured to identify solutions to specific issues, such as, for example, identifying an alternate network route if connectivity over a currently-used network route is lost or degraded, the trust orchestrator platform 202 may identify a cost for a state/trust update corresponding to such a network connection change, and may threshold the cost when deciding whether to perform the update and/or to facilitate the connection switch.

In certain embodiments, the trust orchestrator platform 202 may factor in the pervasiveness of a behavior across a network or across numerous devices when determining whether to adjust a state or trust level. For example, in a case where not only a single source device 204 has transitioned to using a different network route, but one or more other source device(s) 204 and/or one or more other unrelated devices (e.g., in one or more other different or similar contexts) on the same network have also done so similarly, the trust orchestrator platform 202 may "downplay" the impact of the network route transition(s) by forgoing state/trust level adjustments.

In various embodiments, the trust orchestrator platform 202 may associate a cost with resource(s) (e.g., network resources, processing resources, memory resources, power resources, etc.) that are needed to effect a state/trust update, and may or may not perform an update if the cost satisfies (e.g., exceeds) a threshold value.

In one or more embodiments, the trust orchestrator platform 202 may permit a device or network to assert whether a given trust level (e.g., determined and proposed by the trust orchestrator platform 202) is valid or otherwise appropriate for the device or network, and may or may not perform state/trust update(s) and/or facilitate system change(s) depending on the received assertion. For example, the trust orchestrator platform 202 may identify one or more actions that can be taken to improve the state or trust of the overall system (e.g., changing a network path, deactivating a security feature, use of a different authentication or encryption protocol), and may provide, to the destination device 206, data regarding a corresponding trust level associated with those action(s). Continuing the example, the destination device 206 may determine whether that trust level satisfies (e.g., exceeds) a threshold or is otherwise acceptable based on predefined data, such as security parameter(s) or the like. Further continuing the example, in a case where the destination device 206 determines that a proposed trust level does not satisfy the threshold or does not meet the security parameter(s)—e.g., the destination device 206 may be executing a high-security application that requires a high level of trust—the destination device 206 may notify the trust orchestrator platform 202 regarding the determination, and the trust orchestrator platform 202 may forgo the state/trust update(s) and/or facilitation of corresponding system change(s) based on the notification.

In certain embodiments, the trust orchestrator platform 202 may additionally, or alternatively, employ one or more data-based models (e.g., developed based on historical characteristics, parameters, and/or operations in the same or a similar context) to assess an impact of a given state/trust update and/or system change, assign a cost thereto, and/or analyze assertions/queries submitted by a device or network to determine whether to effect the state/trust update and/or system change.

In some embodiments, the trust orchestrator platform 202 may probe a network route by engaging a device (e.g., a source device 204 or a network device 204a, 204b, 208) to respond with one or more tokens over the route. Where different network routes are respectively associated with different trust levels, token-based checks can allow the trust orchestrator platform 202 to ensure that the behavior of the device has not deviated from corresponding established norms and/or that the routes are "safe" to use for communications. In various embodiments, the trust orchestrator platform 202 may not engage or probe only a particular device, but may engage any device that is included as part of a probed network route (such as, e.g., a switch, a router, etc.) and that can be compromised and thus affect the safety of the route.

In this way, the trust orchestration platform 202 may actively engage with other devices as part of effecting overall trust management.

As shown by reference number 228a, the trust orchestrator platform 202 may identify a "loss of trust" condition if a trust level, adjusted based on the change(s) 226, satisfies a threshold. For example, in the case where the one or more source devices 204 alters its network communication path with the destination device 206—i.e., by switching over from the network 204a to the network 204b—the trust orchestrator platform 202 may decide (e.g., based on one or more aforementioned factors, such as a corresponding adjusted trust level being less than a threshold) that this is a sufficient deviation from a norm that deems the one or more source devices 204 untrustworthy. It is to be appreciated and understood that various other changes in characteristics, parameters, and/or operations associated with the one or more source devices 204 (described elsewhere herein or otherwise) may result in a loss of trust. For instance, the trust orchestrator platform 202 may determine that there is a loss of trust based on detecting an alteration in throughput (e.g., transmission of data at a rate that is different than (e.g., faster or slower than) a previously-detected rate), a change in data packet sizes relative to previously-used packet sizes, utilization/accessing of ports that are different from those previously-accessed, exhibiting of faster or slower response times than previously-detected response times, and so on.

As shown by reference number 228b, the trust orchestrator platform 202 may perform one or more actions responsive to the determination of the loss of trust, such as preventing communications between destination device 206 and one or more of the source devices 204. In various embodiments, the trust orchestrator platform 202 may do so by causing one or more of the networks 204a, 204b, and 208 to restrict traffic originating from the one or more source devices 204. In some embodiments, the trust orchestrator platform 202 may additionally, or alternatively, break, or otherwise terminate, a data (or authentication) channel associated with the one or more source devices 204. In one or more embodiments, the trust orchestrator platform 202 may perform one or more other actions, such as arranging for another network route to be used—e.g., network 204a or another trusted network. In certain embodiments, the trust orchestrator platform 202 may push alerts to various device(s), such as the destination device 206, which can enable those device(s) to terminate communications with the one or more source devices 204 or to utilize a different network route.

In exemplary embodiments, the trust orchestrator platform 202 may perform trust recovery operations (e.g., as part of step 228b or subsequent thereto). As shown by reference number 230, the trust orchestrator platform 202 may obtain data from source device(s) 204, network 204a, network 204b, network 208, destination device 206, and/or other external source(s). As shown by reference number 232, the trust orchestrator platform 202 may rebuild (or attempt to rebuild) the trust based on the obtained data. In various embodiments, the trust orchestrator platform 202 may obtain the data as part of modulating the restoration process by application, device, or service. For example, the trust orchestrator platform 202 may be configured to accommodate requests from the destination device 206 concerning device-to-device communications, such as requests to initialize and/or test network services, communication paths, video/audio channels, and so on. This enables the destination device 206 to provide "tune-up" instructions to the trust orchestrator platform 202, which the trust orchestrator platform 202 may execute as part of the trust rebuild process.

In some embodiments, the trust orchestrator platform 202 may search one or more (internal or external) databases for data regarding the same or similar detected anomalous behavior/operation(s) (that have resulted in the present loss of trust) in the same or similar contexts. In a case where the trust orchestrator platform 202 retrieves information indicating that the detected anomalous behavior/operation(s) are normal or are typical in the context—e.g., that switching to an alternate communication path is reasonable if connectivity via a first communication path is degraded or lost—the trust orchestrator platform 202 may document the learning, validate the behavior/operation(s), update data-based model(s) to reflect the validation, update trust level determination/adjustment functionality to treat such behavior/operation(s) as valid, define the associated network topology as being trustworthy in the context, and/or the like. In this case, the trust orchestrator platform 202 may also permit communications to resume between the one or more source device(s) 204 and the destination device 206.

In various embodiments, the trust orchestrator platform 202 may reconcile prior states by performing "replays" of activities/transactions associated with two or more devices (e.g., source device(s) 204 and the destination device 206). In one or more embodiments, the trust orchestrator platform 202 may effect the replays (e.g., by running one or more simulations) using data that has been catalogued for various states, such as the catalogued data described above with respect to reference number 224a. This enables the trust orchestrator platform 202 to traverse the operations in a step-by-step manner to identify how, when, and/or where issue(s) arose.

In certain embodiments, the trust orchestrator platform 202 may perform various analyses of network traffic to identify potential issues or causes of deviations in behavior/operation(s). For instance, the trust orchestrator platform 202 may check packet headers for altered/unaltered traffic, test communication channel safety using known encryption payloads, identify similarities or variances in data header(s)/input(s) for different network sources (e.g., satellite-based network(s), core network(s), drone tethering, backhaul(s), etc.), and so on.

In exemplary embodiments, the trust orchestrator platform 202 may determine and associate cost(s) with various aspects of the trust rebuild/validation process, and may implement the process in accordance with the cost(s). For example, in a case where the trust orchestrator platform 202 identifies (e.g., based on prior data, user input, etc.) that a certain trust reconstruction-related action—e.g., initialization of certain communication protocols, restarting of physical server devices, etc.—is associated with a particular cost, and determines that the particular cost satisfies (e.g., exceeds) a threshold, the trust orchestrator platform 202 may or may not implement the action. In one or more embodiments, cost/risk may be defined based on determined impact(s) on compute resource, energy consumption, or the like.

In various embodiments, the trust orchestrator platform 202 may (e.g., based on prior data, user input, etc.) balance between the need to regain trust with the potential risk of trust model abuse by malicious actors. For instance, it might be possible for a hacker to manipulate the trust model by performing numerous (e.g., hundreds, thousands, or millions of) actions that retrain the model to "move" in a certain direction that is favorable to the hacker. Thus, in one or more embodiments, the trust orchestrator platform 202 may implement time-based and/or quantity-based thresholding for actions performed by devices, such as the source device(s) 204. As an example, the trust orchestrator platform 202 may restrict the number of actions that can be performed over a certain period of time (e.g., no more than two of the same or similar actions over a ten-minute period, etc.). In a similar light, the trust orchestrator platform 202 may require a device (e.g., a source device 204) to revert to a certain network path (e.g., the network 204a) for a threshold period of time before the trust orchestrator platform 202 determines that trust has been regained.

In this way, the trust orchestrator platform 202 may implement a thorough, trust rebuild process that enables entities to (e.g., iteratively or in a staged manner) resume operations and/or communications with one another, with minimal to no user interaction.

In various embodiments, subsequent to completion of a trust rebuild process, the trust orchestrator platform 202 may perform (e.g., continuous) re-evaluation of trust by monitoring the behavior/operation(s) of the source device(s) 204, updating states/trust levels, comparing trust level(s) to threshold(s) according to (e.g., updated) data-based models, analyzing costs, and so on (e.g., similar to that described above).

Various additional or alternative implementations of the trust orchestration platform 202 are possible. As one example, in certain embodiments, the trust orchestrator platform 202 may involve user-based validation in the trust rebuild process. For instance, the trust orchestrator platform 202 may incorporate the use of multi-factor authentication (MFA) (e.g., through password input, biometric validation, etc.) during some or all stages of trust reconstruction, which can provide combined risk reduction.

As another example, in some alternate embodiments, the trust orchestrator platform 202 may facilitate (e.g., automatic and random) switching of communications between different combinations of mesh networking to intentionally introduce "confusion" to potential hackers. This can reduce or eliminate a need to manage trust in the various manners described elsewhere herein. For instance, in a case where a set of network(s), Internet Protocol (IP) addresses, and/or virtual private network(s) (VPN(s)) form a primary backhaul for communications, the trust orchestrator platform 202 may instruct the destination device 206 and/or one or more of the source devices 204 to switch between the various combinations of mesh networks, which can function as a "smokescreen" against attackers attempting to break in.

As a further example, in one or more embodiments, the trust orchestrator platform 202 may be distributed across and embedded in various endpoints as local supervising systems that are controlled by, and that interact with, a main trust orchestrator system, which may reduce operational burden of the main orchestrator.

As will be appreciated from the various embodiments described herein, the trust orchestrator platform 202 may assign to and/or associate trust with not only a single device, such as a single source device 204, but also multiple devices that may be part of a group or class of devices, such as a group or class of source devices 204. If a trust level is associated with a group of devices, the trust orchestrator platform 202 may, when deciding whether trust is loss, distinguish between cases where the behavior of some (but not all) of the devices deviates from an established norm from cases where the behavior of all of the devices deviates from the norm. In cases where the behavior of some (but not all) of the devices deviates from an established norm, the trust orchestrator platform 202 may, despite some deviation-related, trust threshold(s) being exceeded, determine that trust is lost only if a threshold number of the devices is exhibiting the deviating behavior.

As another example, in certain embodiments, the trust orchestrator platform 202 may perform checks or validations of reference data, such as the abovementioned oracle or true source. The trust orchestrator platform 202 may perform such evaluations automatically, periodically, based on user input, based on determining that one or more conditions have been satisfied, or the like.

As yet another example, in various embodiments, the trust orchestrator platform 202 may perform checks or validations of a current trust level. The trust orchestrator platform 202 may perform such evaluations automatically, periodically, based on user input, based on determining that one or more conditions have been satisfied, or the like.

Figure 2C:
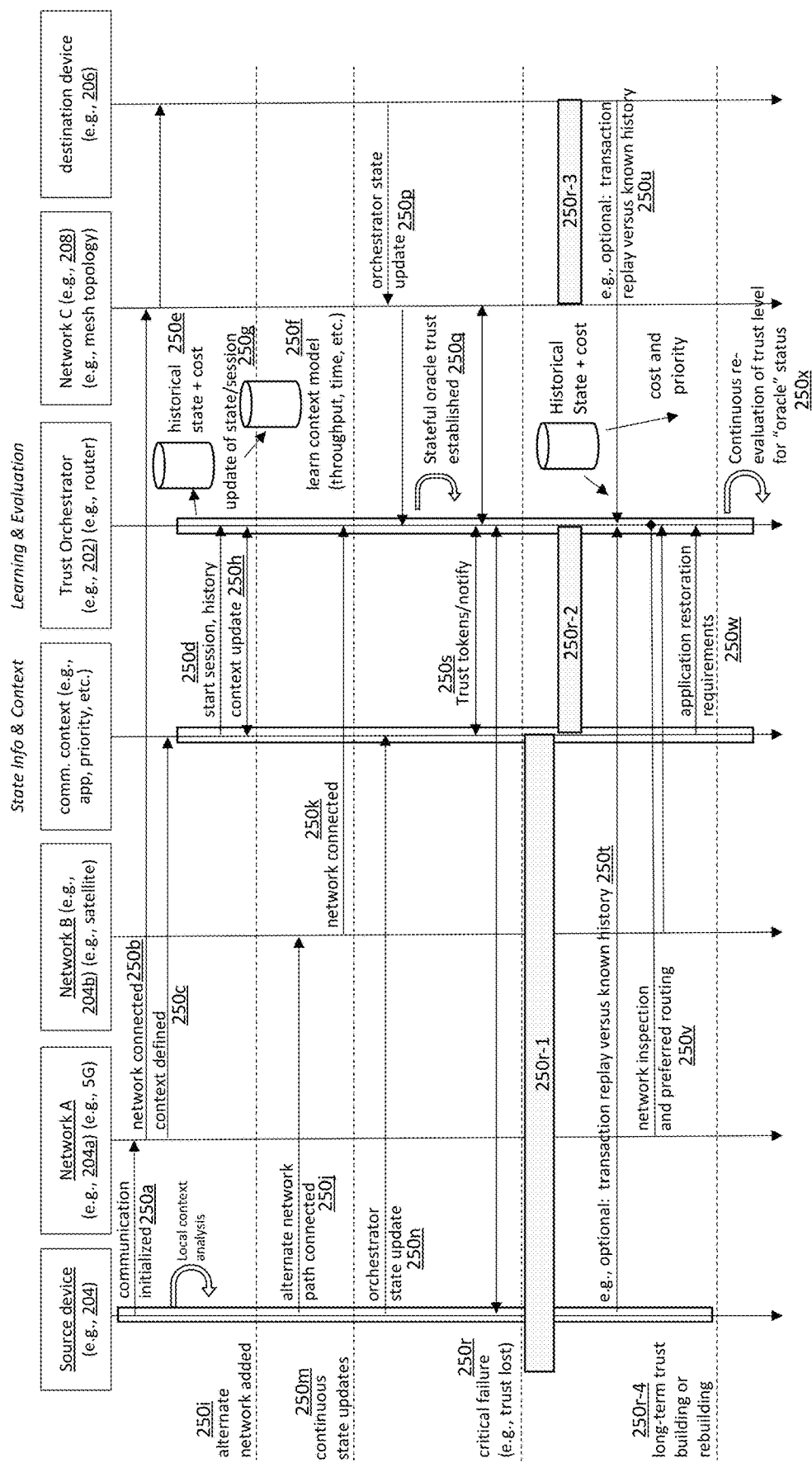
FIG. 2C is a high-level functional block diagram of a system functioning within, or operatively overlaid upon, the communications network of FIG. 1 in accordance with various aspects described herein.

FIG. 2C is a high-level functional block diagram of a system 250 functioning within, or operatively overlaid upon, the communications network 100 of FIG. 1 in accordance with various aspects described herein. In various embodiments, the system 250 may include devices, networks, orchestrator(s), and/or database(s) similar to those in system 200 of FIG. 2A. In certain embodiments, various entities of the system 250 may perform functions similar to those described above with respect to system 200 of FIG. 2A. Such functions may include some or all of the steps 220, 222a, 222b, 222c, 224a, 224b, 226, 228a, 228b, 230, and 232 described above with respect to FIG. 2A.

In one or more embodiments, communications between a source device and a destination device may be initialized over a network A (250a, 250b), and may be detected by a trust orchestrator. The trust orchestrator may define/identify a context (250c) associated with the source and destination devices, initiate a session/state (250d, 250q) based on historical data (250e) and/or an oracle, and employ one or more models to update the state/context model(s)/trust levels (250f, 250g, 250h, 250m, 250n, 250p) based on characteristics, parameters, and/or operations associated with the source device and/or the destination device. Updates may, for example, occur, based on an alternate communication path (250i, 250j, 250k) being used by the source device. Where trust is determined to be lost (e.g., a critical failure) (250r), such as due to trust level(s) satisfying (e.g., exceeding) respective threshold(s), the trust orchestrator may perform trust reconstruction (250r-1, 250r-2, 250r-3, 250r-4), which may involve one or more of effecting token-related exchanges (250s) with the source device and/or the destination device, effecting transaction replays based on known historical behavior/states (250t, 250u), performing network forensics (e.g., network inspection, identification of preferred routes, etc.) (250v), and obtaining (e.g., application) restoration requirements (250w). Subsequent to the trust reconstruction process, the source device and the destination device may resume communications in the context, and the trust orchestrator may continue to re-valuate trust levels (250x), such as by monitoring the behavior/operation(s) of the source device and/or the destination device, updating states/trust levels, comparing trust level(s) to threshold(s) according to (e.g., updated) data-based models, analyzing costs, and so on (e.g., similar to that described above).

It is to be understood and appreciated that the quantity and arrangement of orchestrators/platforms, systems, networks, and devices shown in each of FIGS. 2A and 2C are provided as an example. In practice, there may be additional orchestrators/platforms, systems, networks, and/or devices, fewer orchestrators/platforms, systems, networks, and/or devices, different orchestrators/platforms, systems, networks, and/or devices, or differently arranged orchestrators/platforms, systems, networks, and/or devices than those shown in FIGS. 2A and 2C. For example, the system 200 can include more or fewer orchestrators/platforms, systems, networks, and/or devices, etc. In practice, therefore, there can be hundreds, thousands, millions, billions, etc. of such orchestrators/platforms, systems, networks, and/or devices. In this way, each of example systems 200 and 250 can coordinate, or operate in conjunction with, a set of orchestrators/platforms, systems, networks, and/or devices and/or operate on data sets that cannot be managed manually or objectively by a human actor. Furthermore, two or more orchestrators/platforms, systems, networks, or devices shown in FIG. 2A or 2C may be implemented within a single orchestrator/platform, system, network, or device, or a single orchestrator/platform, system, network, or device shown in FIG. 2A or 2C may be implemented as multiple orchestrators/platforms, systems, networks, or devices. Additionally, or alternatively, a set of orchestrators/platforms, systems, networks, or devices of the system 200 (or 250) may perform one or more functions described as being performed by another set of orchestrators/platforms, systems, networks, or devices of the system 200 (or 250).

It is also to be understood and appreciated that, although each of FIGS. 2A and 2C are described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2D:
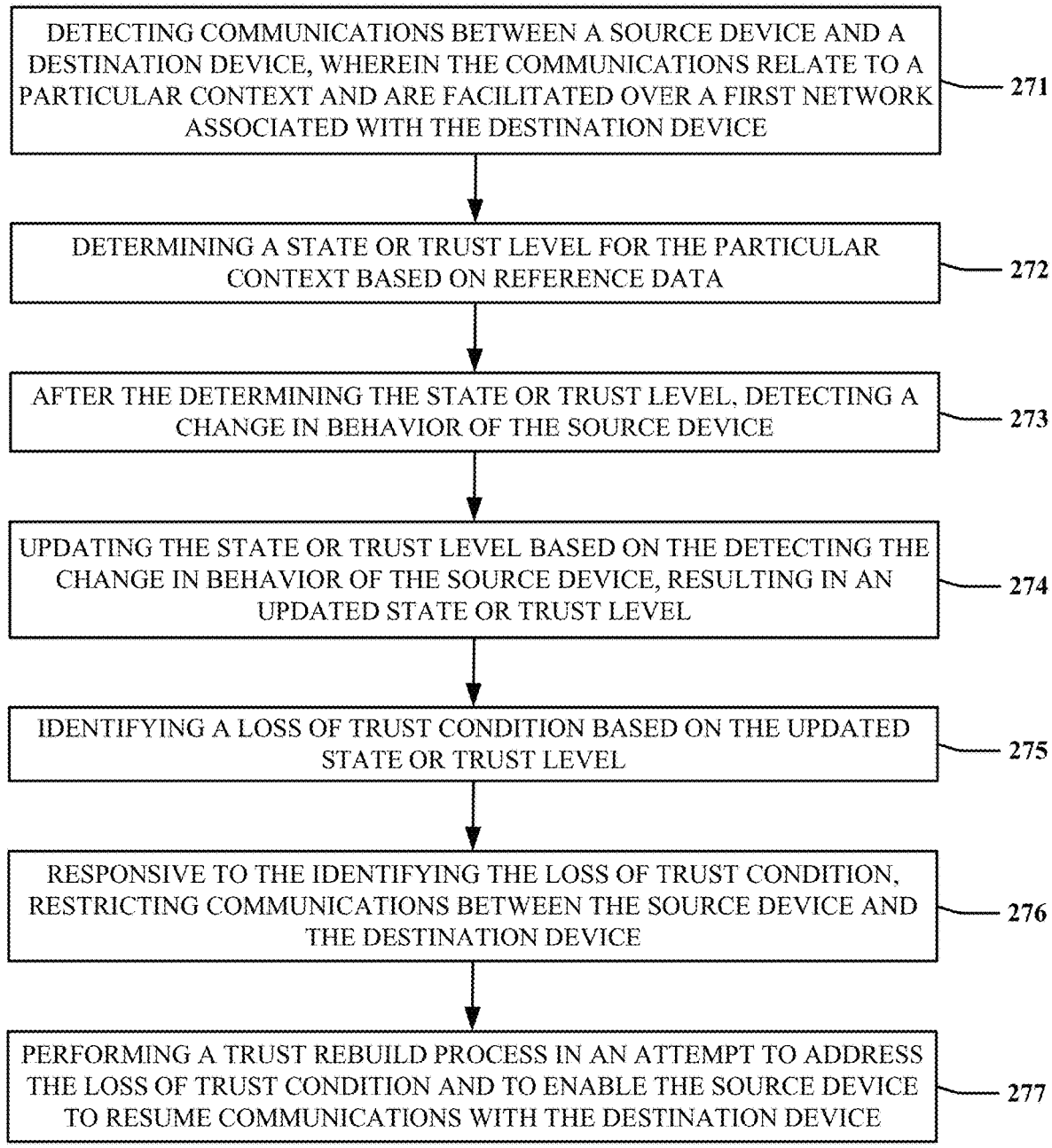
FIG. 2D depicts an illustrative embodiment of a method in accordance with various aspects described herein.

FIG. 2D depicts an illustrative embodiment of a method 270 in accordance with various aspects described herein. In some embodiments, one or more process blocks of FIG. 2D can be performed by a trust orchestrator platform, such as the trust orchestrator platform 202. In some embodiments, one or more process blocks of FIG. 2D may be performed by another device or a group of devices separate from or including the trust orchestrator platform 202, such as the destination device 206 and/or the network 208.

At 271, the method can include detecting communications between a source device and a destination device, wherein the communications relate to a particular context and are facilitated over a first network associated with the destination device. For example, the trust orchestrator platform 202 can, similar to that described elsewhere herein, perform one or more operations that include detecting communications between a source device and a destination device. In various embodiments, the communications may relate to a particular context and are facilitated over a first network associated with the destination device.

At 272, the method can include determining a state or trust level for the particular context based on reference data. For example, the trust orchestrator platform 202 can, similar to that described elsewhere herein, perform one or more operations that include determining a state or trust level for the particular context based on reference data.

At 273, the method can include, after the determining the state or trust level, detecting a change in behavior of the source device. For example, the trust orchestrator platform 202 can, similar to that described elsewhere herein, perform one or more operations that include, after the determining the state or trust level, detecting a change in behavior of the source device.

At 274, the method can include updating the state or trust level based on the detecting the change in behavior of the source device, resulting in an updated state or trust level. For example, the trust orchestrator platform 202 can, similar to that described elsewhere herein, perform one or more operations that include updating the state or trust level based on the detecting the change in behavior of the source device, resulting in an updated state or trust level.

At 275, the method can include identifying a loss of trust condition based on the updated state or trust level. For example, the trust orchestrator platform 202 can, similar to that described elsewhere herein, perform one or more operations that include identifying a loss of trust condition based on the updated state or trust level.

At 276, the method can include, responsive to the identifying the loss of trust condition, restricting communications between the source device and the destination device. For example, the trust orchestrator platform 202 can, similar to that described elsewhere herein, perform one or more operations that include, responsive to the identifying the loss of trust condition, restricting communications between the source device and the destination device.

At 277, the method can include performing a trust rebuild process in an attempt to address the loss of trust condition and to enable the source device to resume communications with the destination device. For example, the trust orchestrator platform 202 can, similar to that described elsewhere herein, perform one or more operations that include performing a trust rebuild process in an attempt to address the loss of trust condition and to enable the source device to resume communications with the destination device.

In some implementations of these embodiments, the source device is associated with a second network that is in communication with the first network. In some implementations of these embodiments, the change in behavior of the source device comprises use of a third network by the source device to communicate with the destination device, where the third network employs an access technology that is different from an access technology employed by the second network.

In some implementations of these embodiments, the change in behavior of the source device comprises a change in throughput, a change in data packet size, a change in response time, accessing of a different port, or a combination thereof.

In some implementations of these embodiments, the reference data comprises historical information associated with behaviors relating to one or more of the source device and the destination device, specification information provided by a vendor or provider associated with one or more of the source device and the destination device, or a combination thereof.

In some implementations of these embodiments, the source device comprises an Internet-of-Things (IoT) device, an uncrewed aerial vehicle (UAV), or a combination thereof. In a related implementation, the source device may be an array of low-capability devices, such as a sensory array network used in a smart city application to compute pollution, audio, or traffic conditions in a smaller environment.

In some implementations of these embodiments, the method can include comparing the updated state or trust level with one or more thresholds, where the identifying the loss of trust condition is based on a determination that the updated state or trust level satisfies the one or more thresholds.

In some implementations of these embodiments, the trust rebuild process involves one or more of identifying and evaluating states for, or across, different communication paths, obtaining data from one or more external sources to modulate restoration of trust by application, device, or service, replaying prior transactions between the source device and the destination device, and analyzing network traffic associated with one or more of the source device and the destination device.

In some implementations of these embodiments, the method can include identifying a priority of the particular context, and determining impacts relating to, and costs associated with, trust level updates based on the priority.

In some implementations of these embodiments, the particular context relates to an uncrewed aerial vehicle (UAV) mission, health-related monitoring, financial transactions, a security service or application, or a combination thereof.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
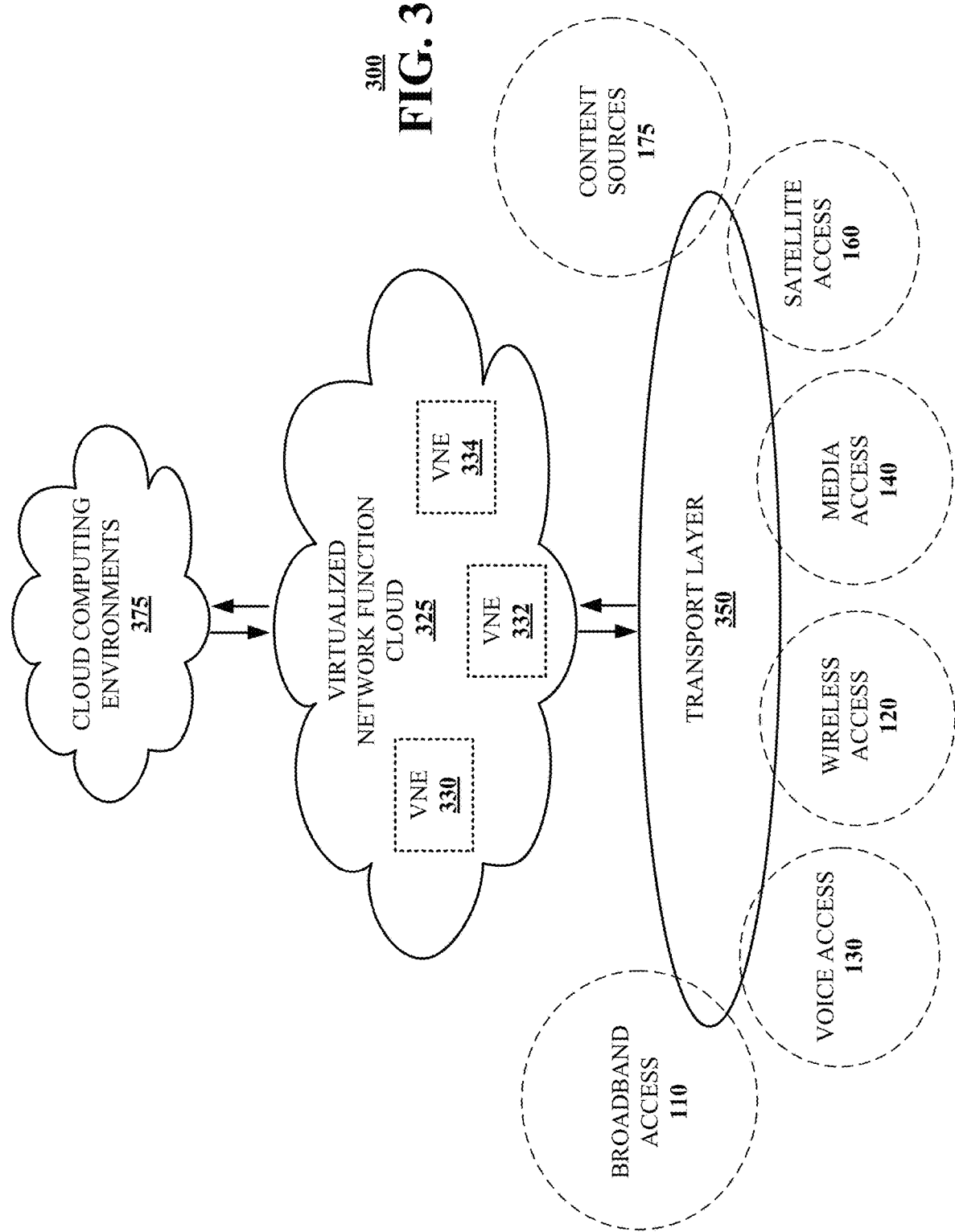
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200 and/or 250, and method 270 presented in FIGS. 1 and 2A-2D. For example, virtualized communications network 300 can facilitate, in whole or in part, learned, adaptive trust management/recovery in mixed environment communications, such as that described herein with respect to one or more of FIGS. 2A-2D.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic, and so the resources are only consumed when needed. In a similar fashion, other network elements such as other routers, switches, edge caches, and middleboxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140, satellite broadband access 160, and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
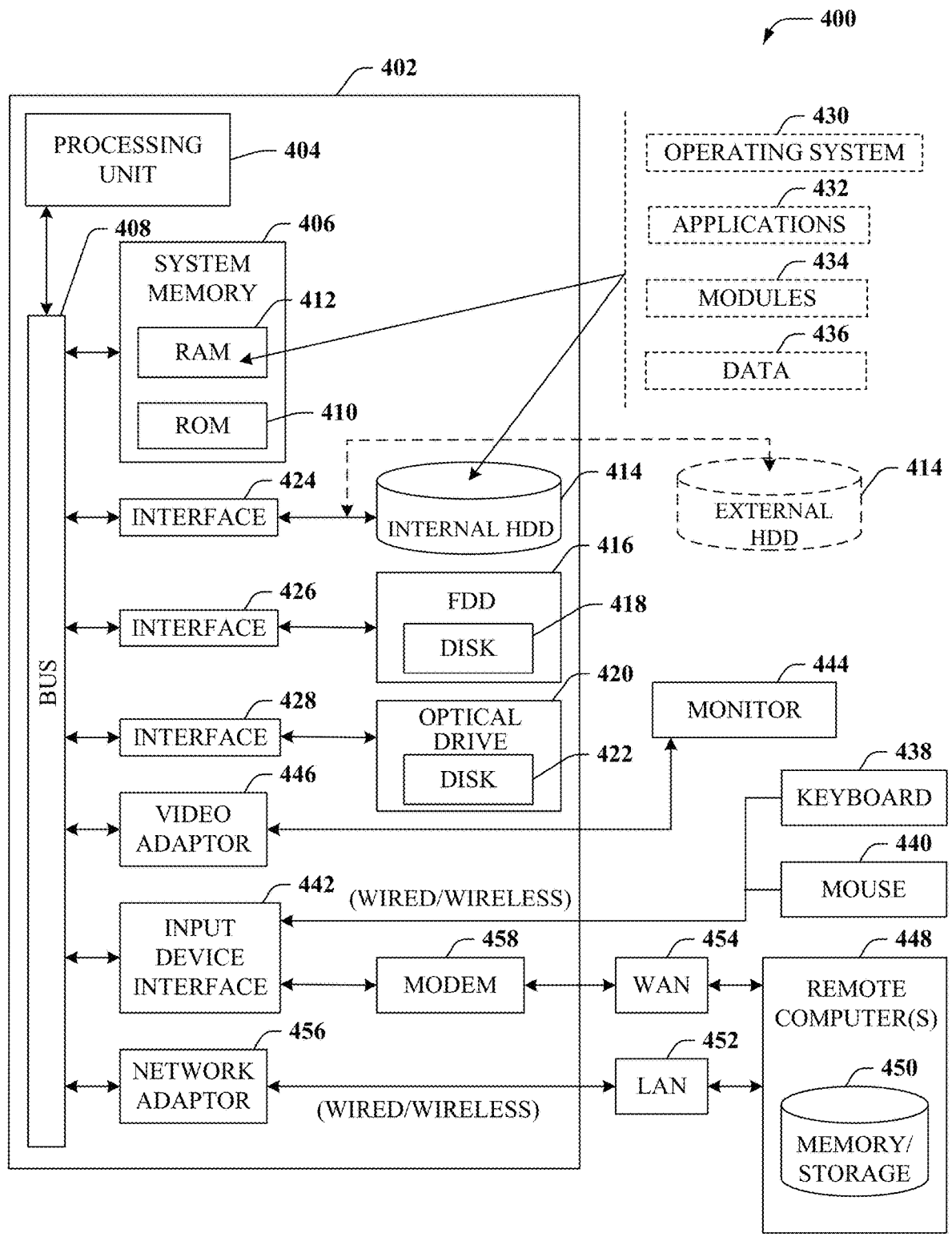
FIG. 4 is a block diagram of an example, non-limiting embodiment of a computing environment in accordance with various aspects described herein.

Turning now to FIG. 4, a block diagram of a computing environment is shown in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, learned, adaptive trust management/recovery in mixed environment communications, such as that described herein with respect to one or more of FIGS. 2A-2D.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
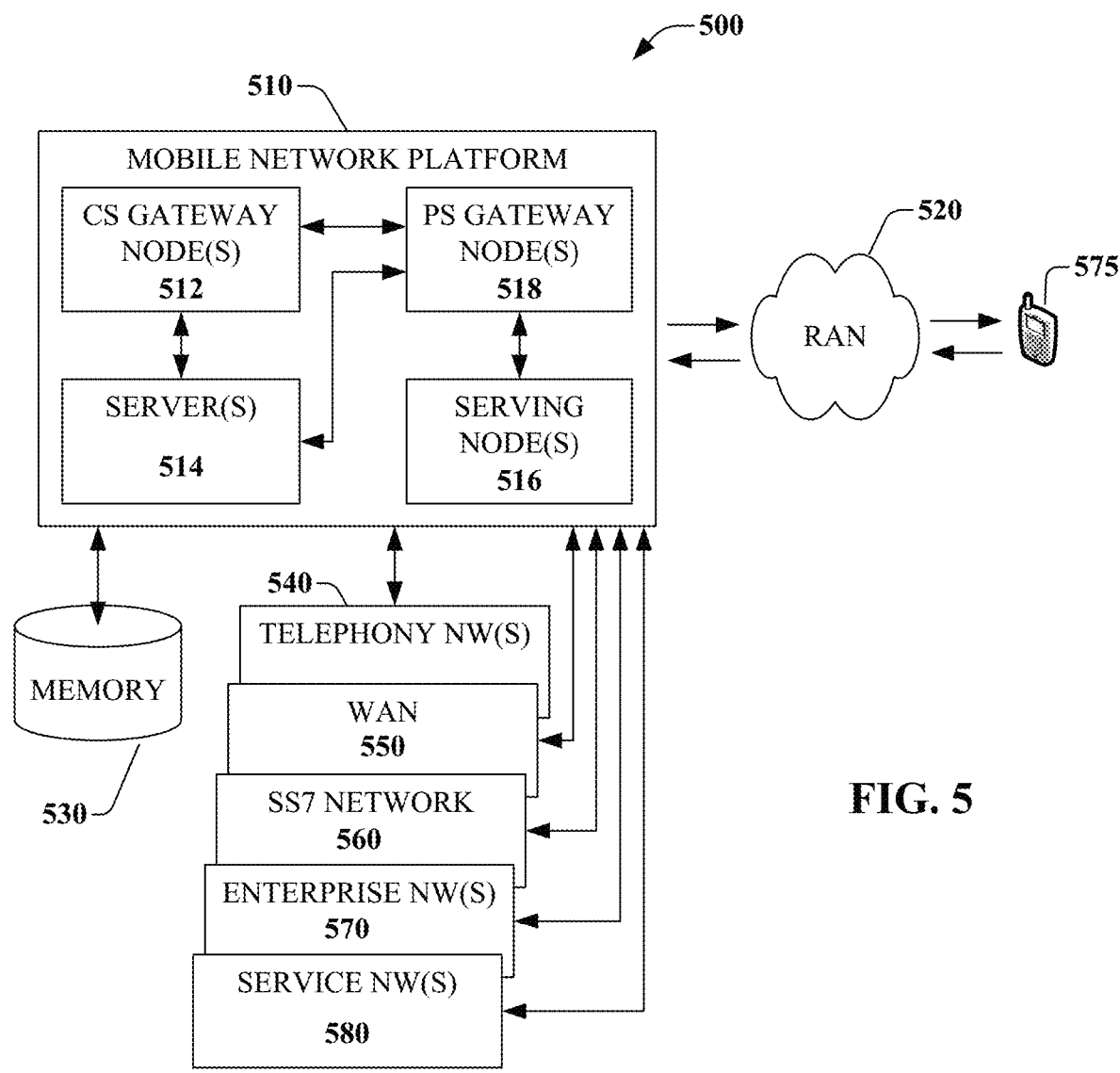
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, learned, adaptive trust management/recovery in mixed environment communications, such as that described herein with respect to one or more of FIGS. 2A-2D. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
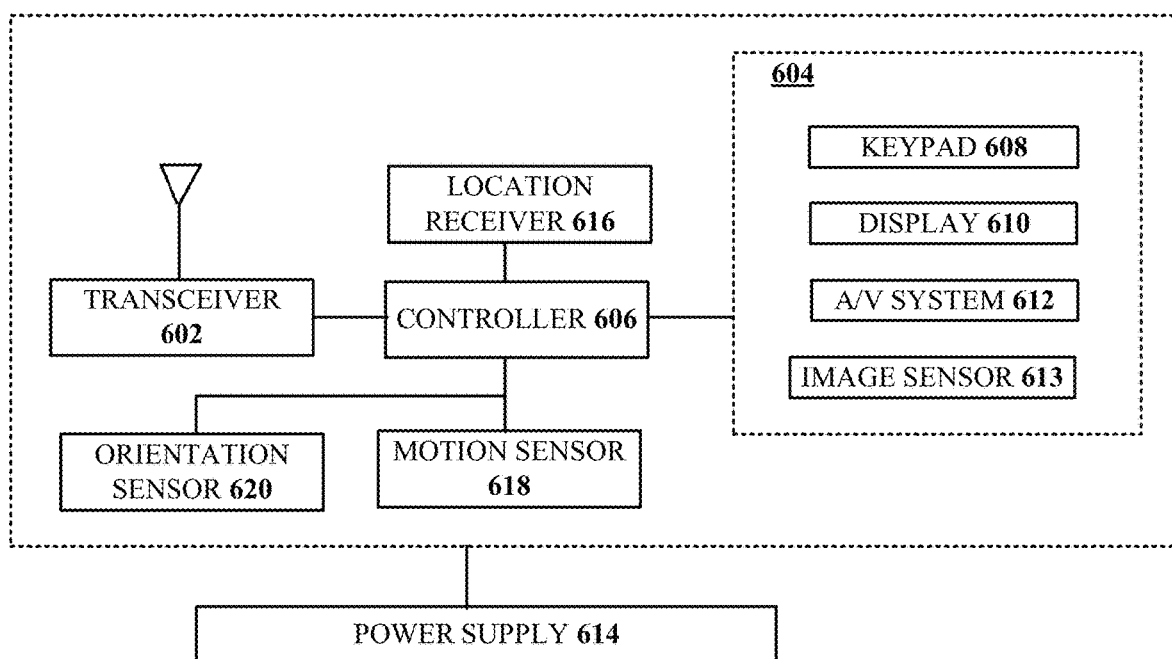
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, learned, adaptive trust management/recovery in mixed environment communications, such as that described herein with respect to one or more of FIGS. 2A-2D.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low-volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   detecting communications between a source device and a destination device, wherein the communications are facilitated over a first network associated with the destination device;
   determining a state or trust level for a particular context of the communications between the source device and the destination device based on reference data, wherein the particular context concerns a type of the communications, an application, or a service of the source device and the destination device and a type of the first network facilitating the communications;
   after the determining the state or trust level, detecting a change in behavior of the communications of the source device;
   updating the state or trust level based on the detecting the change in behavior of the source device, resulting in an updated state or trust level;
   identifying a loss of trust condition based on the updated state or trust level;
   responsive to the identifying the loss of trust condition, restricting the communications between the source device and the destination device; and
   performing a trust rebuild process in an attempt to address the loss of trust condition and to enable the source device to resume the communications between the source device and the destination device.

2. The device of claim 1, wherein the source device is associated with a second network that is in communication with the first network.

3. The device of claim 2, wherein the change in behavior of the source device comprises use of a third network by the source device to communicate with the destination device, and wherein the third network employs an access technology that is different from an access technology employed by the second network.

4. The device of claim 1, wherein the change in behavior of the source device comprises a change in throughput, a change in data packet size, a change in response time, accessing of a different port, or a combination thereof.

5. The device of claim 1, wherein the reference data comprises:
   historical information associated with behaviors relating to one or more of the source device and the destination device;

specification information provided by a vendor or provider associated with one or more of the source device and the destination device; or
a combination thereof.

6. The device of claim 1, wherein the source device comprises an Internet-of-Things (IoT) device, an uncrewed aerial vehicle (UAV), a sensory array network employed in a smart city application, or a combination thereof.

7. The device of claim 1, wherein the operations further comprise comparing the updated state or trust level with one or more thresholds, and wherein the identifying the loss of trust condition is based on a determination that the updated state or trust level satisfies the one or more thresholds.

8. The device of claim 1, wherein the trust rebuild process involves one or more of:
identifying and evaluating states for, or across, different communication paths;
obtaining data from one or more external sources to modulate restoration of trust by application, device, or service;
replaying prior transactions between the source device and the destination device; and
analyzing network traffic associated with one or more of the source device and the destination device.

9. The device of claim 1, wherein the operations further comprise identifying a priority of the particular context, and determining impacts relating to, and costs associated with, trust level updates based on the priority.

10. The device of claim 1, wherein the particular context relates to an uncrewed aerial vehicle (UAV) mission, health-related monitoring, financial transactions, a security service or application, confidential computing, or a combination thereof.

11. A non-transitory machine-readable medium, comprising executable instructions that, when executed by a processing system of a destination device including a processor, facilitate performance of operations, the operations comprising:
establishing communications with a plurality of source devices, wherein the communications relate to a context of the communications between the plurality of source devices and the destination device, wherein the communications are monitored by a trust orchestrator, and wherein the trust orchestrator is configured to provide adaptive trust management by:
determining a trust level that corresponds to a reference state for the context of the communications between the plurality of source devices and the destination device, wherein the context concerns a type of the communications, an application, or a service of the source device and the destination device,
monitoring communications associated with one or more source devices of the plurality of source devices,
identifying actions to be performed based on monitored communications, and
computing adjusted trust levels for the actions;
obtaining, from the trust orchestrator, information regarding a particular trust level that corresponds to a particular action;
determining whether the particular trust level is acceptable based on a security parameter; and
responsive to a determination that the particular trust level is not acceptable based on the security parameter, providing, to the trust orchestrator, a notification of the determination to prevent the trust orchestrator from facilitating the particular action.

12. The non-transitory machine-readable medium of claim 11, wherein the operations, performed based on execution of the executable instructions, further comprise querying the trust orchestrator for trust level data, and wherein the obtaining the information regarding the particular trust level is responsive to the querying.

13. The non-transitory machine-readable medium of claim 11, wherein the trust orchestrator is implemented in the destination device or is distributed across one or more nodes of a network associated with the destination device.

14. The non-transitory machine-readable medium of claim 11, wherein the particular action comprises one or more of altering a communication path, deactivating a security feature, use of a different authentication or encryption protocol, or a combination thereof.

15. The non-transitory machine-readable medium of claim 11, wherein the operations, performed based on execution of the executable instructions, further comprise:
obtaining, from the trust orchestrator, other information regarding a second trust level that corresponds to a second action;
determining whether the second trust level is acceptable based on the security parameter; and
responsive to a second determination that the second trust level is acceptable based on the security parameter, providing, to the trust orchestrator, a second notification of the second determination to permit the trust orchestrator to facilitate the second action.

16. A method, comprising:
initializing, by a processing system including a processor, a session based on detecting communications between a source device and a destination device, wherein the communications relate to a context;
determining, by the processing system, a reference state for the source device and the destination device in accordance with an oracle, wherein the oracle includes reference data relating to an accepted norm for the context, wherein the context concerns a type of the communications, an application, or a service of the source device and the destination device;
monitoring, by the processing system, operations associated with one or more of the source device and the destination device;
responsive to detecting, according to the monitoring, a change in behavior of the communications of the source device, determining, by the processing system, a state change and a corresponding trust level;
identifying, by the processing system, a loss of trust condition based on the state change or the corresponding trust level; and
effecting, by the processing system, trust reconstruction in an attempt to address the loss of trust condition and to enable the source device to continue communicating with the destination device.

17. The method of claim 16, wherein one or more of the determining the state change and the corresponding trust level, the identifying the loss of trust condition, and the effecting the trust reconstruction are performed using one or more machine learning (ML) models.

18. The method of claim 16, further comprising, responsive to the monitoring, updating, by the processing system, a model for the context based on data-based learning of identified acceptable conditions.

19. The method of claim 16, further comprising associating one or more costs with the trust reconstruction, wherein the effecting the trust reconstruction is in accordance with the one or more costs.

20. The method of claim 16, wherein the source device is included in a group or class of source devices that are in communication with the destination device.

* * * * *